United States Patent
Rajauria et al.

(10) Patent No.: US 9,768,593 B2
(45) Date of Patent: Sep. 19, 2017

(54) INTRA-COMPARTMENT COOLING CHANNEL COMPONENT FOR A METAL-CLAD SWITCHGEAR ASSEMBLY

(71) Applicant: General Electric Company, Schenectady, NY (US)

(72) Inventors: Samir Rajauria, Agra (IN); Ayyappa Reddy Jakkireddy, Hyderabad (IN); Guru Moorthy Kurra, Hyderabad (IN); Lenin Pokkula, Hyderabad (IN)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 15/050,762

(22) Filed: Feb. 23, 2016

(65) Prior Publication Data

US 2017/0244226 A1    Aug. 24, 2017

(51) Int. Cl.
    *H02B 1/56*      (2006.01)
    *H02B 13/025*    (2006.01)
    *H02B 1/46*      (2006.01)

(52) U.S. Cl.
    CPC .............. *H02B 1/565* (2013.01); *H02B 1/46* (2013.01); *H02B 13/025* (2013.01)

(58) Field of Classification Search
    CPC .............................. H02B 1/565; H02B 13/025
    See application file for complete search history.

(56) References Cited

U.S. PATENT DOCUMENTS

| | | | | |
|---|---|---|---|---|
| 3,301,168 A | * | 1/1967 | Schindler | A62B 13/00 137/512.15 |
| 5,574,624 A | | 11/1996 | Rennie et al. | |
| 5,698,818 A | * | 12/1997 | Brench | H05K 9/0041 174/383 |
| 6,348,653 B1 | * | 2/2002 | Cho | H05K 9/0041 174/383 |

(Continued)

FOREIGN PATENT DOCUMENTS

| | | | | |
|---|---|---|---|---|
| EP | 576457 B1 | 4/1996 | | |
| FR | EP 2722947 A1 | * 4/2014 | ............. | H02B 1/565 |

(Continued)

*Primary Examiner* — Robert J Hoffberg
(74) *Attorney, Agent, or Firm* — General Electric Company

(57) ABSTRACT

Electrical enclosure including circuit breaker, exterior panels defining a volume, wall separating compartments defined in the volume, and cooling channel component. Cooling channel component includes first plate coupled to wall. First plate includes first end and a second opposite end coupled to wall, the first plate covering an opening defined in wall and having a first aperture defined therethrough, first aperture having a first shape and a first orientation. Cooling channel component also includes electrically conductive second plate coupled to first plate and having a first end coupled to first plate first end and a second opposite end coupled to first plate second end, the second plate having at least one second aperture defined therethrough, the second aperture having a second shape and a second orientation, where a hollow cavity is defined between the first and second plates, and where the first and second apertures are arranged in a non-overlapping configuration.

20 Claims, 5 Drawing Sheets

(56) References Cited

U.S. PATENT DOCUMENTS

| | | | |
|---|---|---|---|
| 6,827,643 B2 * | 12/2004 | Eiselt | H02B 1/56 |
| | | | 174/17 VA |
| 7,054,143 B2 | 5/2006 | Eiselt et al. | |
| 7,095,606 B2 | 8/2006 | Mahn et al. | |
| 7,390,976 B2 * | 6/2008 | Liang | H05K 9/0041 |
| | | | 174/383 |
| 8,072,752 B2 | 12/2011 | Wantschik | |
| 8,804,374 B2 * | 8/2014 | Gilliland | H05K 9/0041 |
| | | | 174/66 |
| 2008/0165473 A1 | 7/2008 | Kramer | |
| 2008/0212265 A1 | 9/2008 | Mazura et al. | |
| 2014/0110232 A1 | 4/2014 | Gingrich | |
| 2014/0133071 A1 | 5/2014 | Gingrich | |

FOREIGN PATENT DOCUMENTS

| | | | | |
|---|---|---|---|---|
| FR | EP 3021435 A1 * | 5/2016 | | H02B 1/56 |
| JP | WO 2009001425 A1 * | 12/2008 | | H02B 1/565 |
| NL | GB 2519807 A * | 5/2015 | | F24F 13/082 |
| WO | 2013110430 A1 | 8/2013 | | |

* cited by examiner a cooling channel component device, system, and method to provide air flow between compartments of metal-clad electrical enclosures without introducing intentional openings between compartments.

INTRA-COMPARTMENT COOLING CHANNEL COMPONENT FOR A METAL-CLAD SWITCHGEAR ASSEMBLY

BACKGROUND

The field of the disclosure relates generally to safety devices for electrical enclosures, and, more specifically, to a cooling channel component device, system, and method to provide air flow between compartments of metal-clad electrical enclosures without introducing intentional openings between compartments.

Known electrical enclosures with switchgear equipment include multiple compartments including a line or busbar portion and a load or circuit breaker portion. The busbar portion includes at least one busbar coupled to an electrical load through voltage line terminals. Circuit breakers enable interruption of electrical current flow of current to connected loads. Devices inside known electrical enclosures such as busbars, circuit breakers, and voltage line terminals generate heat during operation. Such known electrical enclosures also include covered vents on exterior panels to allow exterior air from the environment to enter the electrical enclosure for cooling purposes and to prevent accumulation of hazardous gas fumes. Air exchange with the exterior environment facilitates safe operation of such known electrical enclosures.

During operation and maintenance activities of at least some known electrical enclosures, electrical arcs are additional safety and reliability considerations along with adequate cooling. Various standards exist, including from standard-making bodies such as the Institute of Electrical and Electronic Engineers (IEEE), which state that compartments of electrical enclosures be separated by grounded metal barriers with no intentional openings between compartments. Such standards are meant to mitigate risk to operational continuity and safety of operators, maintenance personnel, bystanders, and property from arc events, but they complicate effective intra-compartment air exchange and cooling in known electrical enclosures.

BRIEF DESCRIPTION

In one aspect, an electrical enclosure is provided. The electrical enclosure includes at least one circuit breaker, a plurality of exterior panels defining a volume, a wall separating two compartments defined in the volume, and a cooling channel component. The cooling channel component includes an electrically conductive first plate coupled to the wall. The first plate includes a first end coupled to the wall and a second opposite end coupled to the wall, the first plate covering an opening defined in the wall and having at least one first aperture defined therethrough, the at least one first aperture having a first shape and a first orientation. The cooling channel component also includes an electrically conductive second plate coupled to the first plate and having a first end coupled to the first plate first end and a second opposite end coupled to the first plate second end, the second plate having at least one second aperture defined therethrough, the at least one second aperture having a second shape and a second orientation, where a hollow cavity is defined between the first plate and the second plate, and where the at least one first aperture and the at least one second aperture are arranged in a non-overlapping configuration.

In another aspect, a cooling channel component for an electrical enclosure is provided. The electrical enclosure includes at least one circuit breaker. The cooling channel component includes an electrically conductive first plate coupled to a wall of the electrical enclosure that separates two compartments of the electrical enclosure. The first plate includes a first end coupled to the wall and a second opposite end coupled to the wall, the first plate covering an opening defined in the wall and having at least one first aperture defined therethrough, the at least one first aperture having a first shape and a first orientation. The cooling channel component also includes an electrically conductive second plate coupled to the first plate. The second plate includes a first end coupled to the first plate first end and a second opposite end coupled to the first plate second end, the second plate having at least one second aperture defined therethrough, the at least one second aperture having a second shape and a second orientation, where a hollow cavity is defined between the first plate and the second plate, and where the at least one first aperture and the at least one second aperture are arranged in a non-overlapping configuration.

In still another aspect, a method of assembling an electrical enclosure is provided. The electrical enclosure includes at least one circuit breaker, a plurality of compartments, and a wall separating at least two compartments of the plurality of compartments. The method includes forming, from an electrically conductive material, a cooling channel component. The cooling channel component includes a hollow cavity defined between a first plate and a second plate of the cooling channel component. The method also includes defining at least one first aperture having a first shape and a first orientation through the first plate. The method further includes defining at least one second aperture having a second shape and a second orientation through the second plate. The method also includes coupling the cooling channel component to the wall, where the at least one first aperture and the at least one second aperture are arranged in a non-overlapping configuration.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The cooling channel component devices and associated systems and methods thereof described herein are suited to facilitate air-exchange between compartments of electrical enclosures. The embodiments described herein are also suited to facilitate effective heat exchange between electrical devices operating inside electrical enclosures and an external environment thereof. The cooling channel component devices and associated systems and methods thereof described herein are further suited to facilitate safe and continuous operation of electrical enclosures. The systems and methods described herein are also suited to prevent intra-compartment travel of electrical arcs arising from arc events occurring inside of electrical enclosures. The cooling channel component devices and associated systems and methods thereof described herein are further suited to meet electrical enclosure construction and operation standards from, for example, Institute of Electrical and Electronics Engineers (IEEE), by facilitating intra-compartment airflow without introducing intentional openings between compartments.

Figure 1:
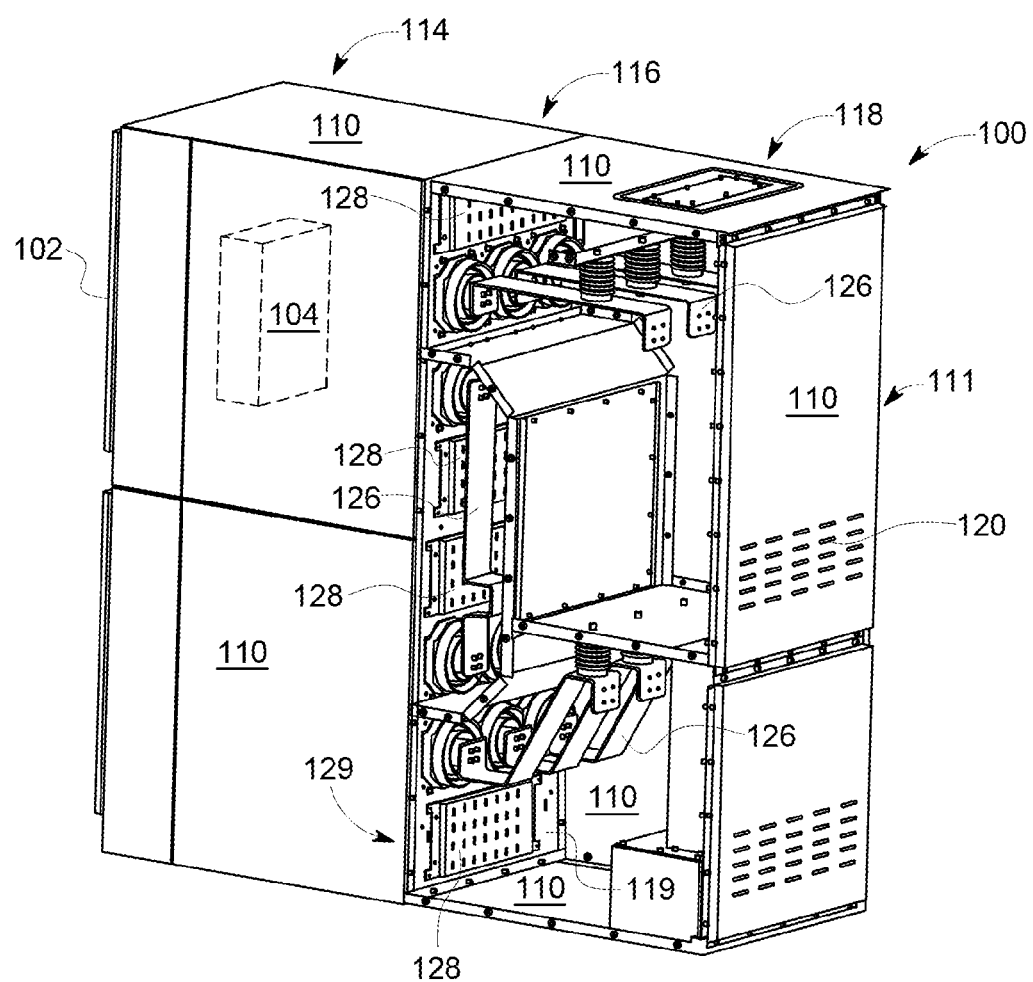
FIG. 1 is a perspective and partial cutaway schematic diagram of an exemplary embodiment of an electrical enclosure.

FIG. 1 is a perspective and partial cutaway schematic diagram of an exemplary embodiment of an electrical enclosure 100. In the exemplary embodiment, electrical enclosure 100 includes a door 102. Two doors 102 are shown in FIG. 1, one for each of two stacked units of electrical enclosure 100. Electrical enclosure 100 also includes a plurality of metal or metal-clad exterior panels 110 defining a volume. Exterior panels 110, along with internal frame members, not shown, provide structural support and protection from conditions present in an external environment 111 outside electrical enclosure 100. Behind door 102 is an access panel, not shown, into which at least one circuit breaker 104, may be selectively installed and uninstalled. Also, in the exemplary embodiment, electrical enclosure 100 in FIG. 1, electrical enclosure 100 includes at least two compartments, i.e., portions, including, without limitation: a breaker portion 114, a bus connection portion 116, and a busbar portion 118. Portions, of electrical enclosure 100 are separated by metal or metal-clad walls 119 coupled to and between exterior panels 110 and/or frame members, where wall 119 separates two of the compartments, i.e., portions.

Also, in the exemplary embodiment, to facilitate air exchange between at least one compartment of electrical enclosure 100 and external environment 111, one or more exterior panels 110 include one or more covered vents 120. In other embodiments, not shown, covered vents 120 are also defined in one or more doors 102. Covered vents 120 facilitate exchange of air from an exterior of electrical enclosure 100 and further facilitate prevention of accumulation of fumes therein.

Further, in the exemplary embodiment, electrical enclosure 100 includes a plurality of electrical lines, switches, connectors, and various other electrical components necessary to connect electrical load devices to main power lines and circuit breakers 104. Within busbar portion 118, for example, at least one busbar 126 transmits an electrical current to and from exterior of electrical enclosure 100 and at least one of bus connection portion 116 and breaker portion 114. In the exemplary embodiment, busbars 126 are exposed metal to facilitate exchange and transfer of heat due to electrical current flow in busbars 126 to the interior of the various compartments of electrical enclosure 100.

Figure 2:
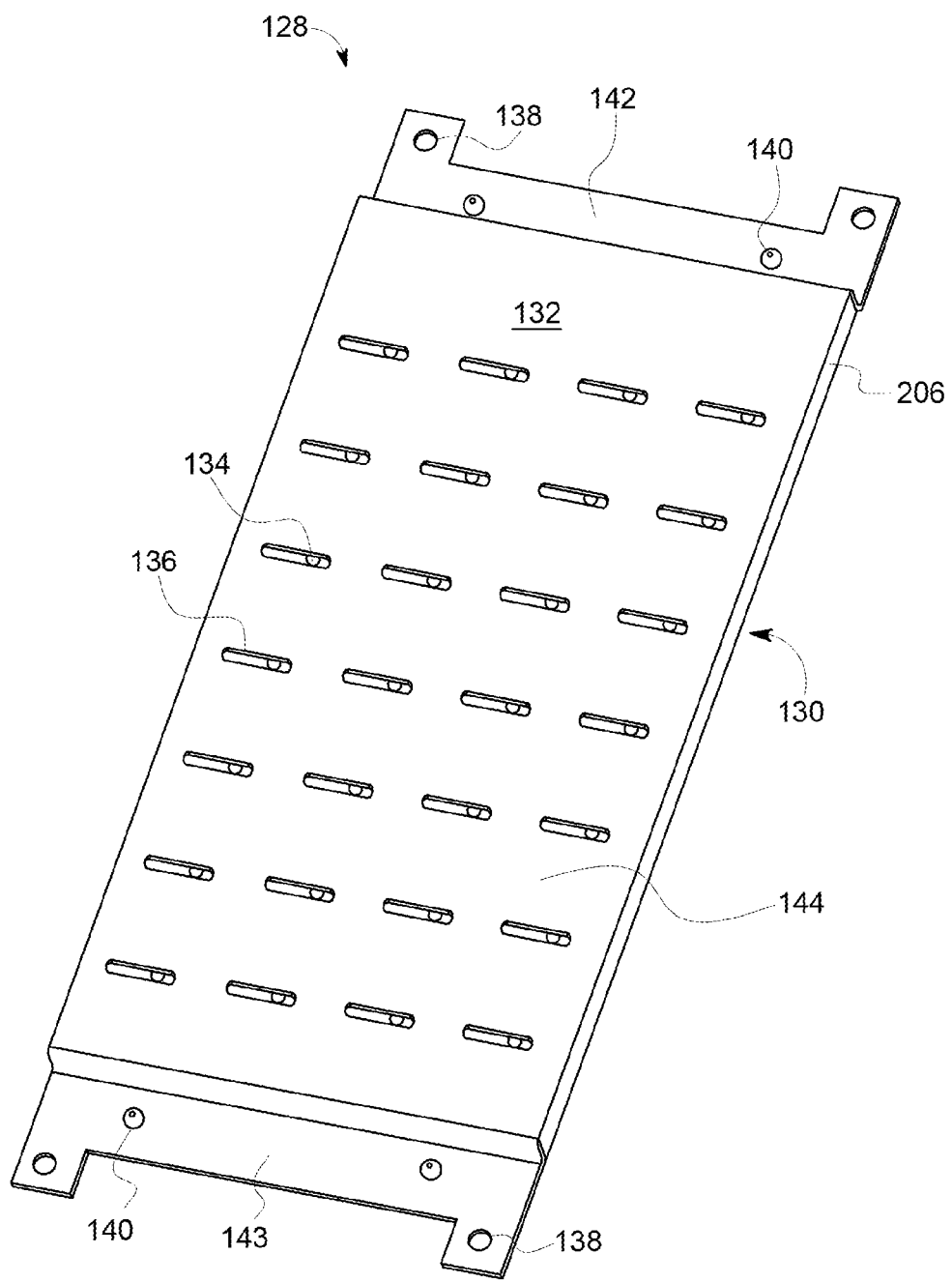
FIG. 2 is an enlarged perspective schematic view of an exemplary embodiment of a cooling channel component that may be used with the electrical enclosure shown in FIG. 1.

Furthermore, in the exemplary embodiment, electrical enclosure 100 includes at least one cooling channel component 128. FIG. 2 is an enlarged perspective schematic view of an exemplary embodiment of a cooling channel component that may be used with the electrical enclosure shown in FIG. 1. Cooling channel component 128 is coupled to wall 119 in the exemplary embodiment, and covers an opening 129 defined through wall 119. In other embodiments, not shown, cooling channel component 128 and wall 119 are formed continuously as a one-piece construction. Also, in the exemplary embodiment, cooling channel component 128 is generally rectangular. Cooling channel component 128 is configured to facilitate intra-compartment air exchange within electrical enclosure 100. Further, in the exemplary embodiment, a plurality of cooling channel components 128 are installed in electrical enclosure 100 on wall 119 between bus connection portion 116 and busbar portion 118. In other embodiments, not shown, at least one cooling channel component 128 is installed in one or more walls 119 between compartments other than bus connection portion 116 and busbar portion 118, and/or between exterior panels 110 and external environment 111 of electrical enclosure 100.

Moreover, in the exemplary embodiment, cooling channel component 128 includes a metal or metal-clad (i.e., electrically conductive) first plate 130 and an electrically conductive second plate 132. When installed into wall 119 of electrical enclosure 100, first plate 130 faces breaker portion 114 and second plate 132 faces busbar portion 118. First plate 130 includes at least one first aperture 134 defined therethrough. Second plate 132 includes at least one second aperture 136 defined therethrough. In the exemplary embodiment, both of first plate 130 and second plate 132 have the same material of construction. In other embodiments, not shown, first plate 130 has a different material of construction than second plate 132, depending on specific applications and configurations within electrical enclosure 100.

As shown in FIG. 2, in the exemplary embodiment, first apertures 134 are elongate arcuate-shaped slots oriented in a first direction and second apertures 136 are elongate arcuate-shaped slots oriented in a substantially orthogonal direction relative to the first direction. In other embodiments, not shown, first aperture 134 and second aperture 136 are not elongate arcuate-shaped slots, but rather include apertures of other shapes including circular, square, rectangular, triangular, polygonal, and other suitable shapes to facilitate intra-compartment air exchange depending on specific applications and configurations within electrical enclosure 100. In still other embodiments, not shown, first aperture 134 is of a different shape and/or at a different orientation than second aperture 136 depending on specific applications and configurations within electrical enclosure 100. In the exemplary embodiment, first aperture 134 is defined through first plate 130 such that no portion of first aperture 134 overlaps with any portion of second aperture 136. In other words, first aperture 134 is not visible to an observer viewing cooling channel component 128 from directly perpendicular to second plate 132. As such, at least one first aperture 134 and at least one second aperture 136 are arranged in a non-overlapping configuration on first plate 130 and second plate 132, respectively.

Also, in the exemplary embodiment, cooling channel component 128 contains a plurality of coupling points 138 located on at least two corners of both first plate 130 and second plate 132. Coupling points 138 are configured to facilitate coupling installation of cooling channel component 128 to wall 119 including, without limitation, using bolts and nuts. In other embodiments, not shown, coupling of cooling channel component 128 to wall 119 may be accomplished, for example, using welding, cementing, and other adhesive-based methods. In such embodiments, cooling channel component 128 need not include coupling points 138. Further, in the exemplary embodiment, first plate 130 and second plate 132 are coupled together using at least two plate couplers 140 including, without limitation, rivets. First plate 130 is a substantially flat piece fitting to second plate 132. Second plate 132 is not entirely substantially flat, but rather includes two substantially flat sections: a first planar section 142 and a second planar section 143. Second plate 132 also includes a third planar section 144 offset from between first planar section 142 and second planar section 143. First planar section 142 and second planar section 143 couple to first plate 130 by way of plate couplers 140, which results in an at least partially enclosed hollow void, i.e., hollow cavity, not shown, defined between third planar section 144 and first plate 130.

In operation, in the exemplary embodiment, flow of electrical current in busbars 126 and other electrical devices generates heat within electrical enclosure 100. Also, electrical enclosure 100 is subject to conditions including temperature fluctuations in external environment 111. Covered vents 120 enable air exchange and facilitate cooling of an interior of electrical enclosure 100. Cooling channel component 128 facilitates additional airflow and cooling within electrical enclosure 100 on an intra-compartment basis. Using cooling channel component 128 on wall 119 inside electrical enclosure 100 provides an airflow path between compartments including, without limitation, breaker portion 114, bus connection portion 116, and busbar portion 118, and covered vents 120, thus facilitating faster heat exchange between electrical devices, for example busbars 126 and circuit breakers 104, and external environment 111.

Also, in operation of the exemplary embodiment, the metal or metal-clad material of wall 119 and cooling channel component 128 facilitates electrical contact with and grounding between electrical enclosure 100 and cooling channel component 128. Metal to metal coupling of cooling channel component 128 to wall 119 facilitates directing an electrical arc event within a compartment of electrical enclosure 100 to ground. First apertures 134 and second apertures 136 facilitate intra-compartment airflow as described above, but also do not introduce intentional openings by virtue of their staggered, i.e., non-direct line-of-sight, arrangement on first plate 130 with respect to second plate 132. As such, cooling channel components 128 are further configured to facilitate prevention of intra-compartment transmission, i.e., travel, of an electrical arc in the event of an arc event within or outside of electrical enclosure 100. In the event of an arc in bus connection portion 116, for example, traveling to and entering first apertures 134 of first plate 130, the arc has a higher probability of next striking second plate 132 at a solid metal portion thereof than continuing to travel into busbar portion 118 through second apertures 136. Thus, the arc will be directed to an electrical grounding apparatus of electrical enclosure 100 through cooling channel component 128 and wall 119, and further through exterior panels 110 and such other portions of electrical enclosure 100 designed for facilitating a path to electrical ground.

Figure 3:
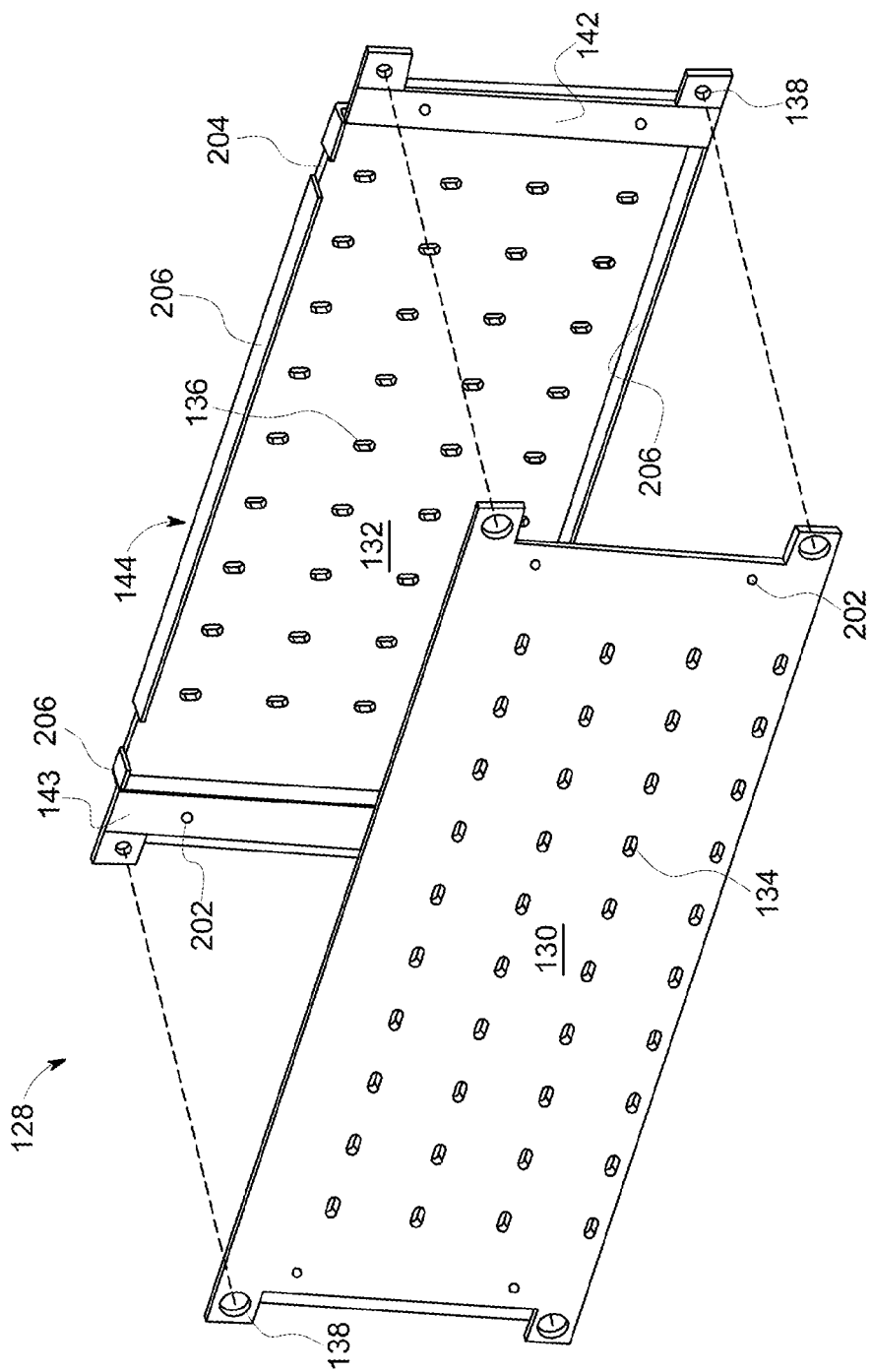
FIG. 3 is a perspective assembly view schematic diagram of an exemplary embodiment of a cooling channel component that may be used with the electrical enclosure shown in FIG. 1.

FIG. 3 is a perspective assembly view schematic diagram of an exemplary embodiment of a cooling channel component 128 that may be used with the electrical enclosure 100 shown in FIG. 1. In the exemplary embodiment, first plate 130 couples to second plate 132 using at least two bores 202. First plate 130 is coupled to second plate 132 using bores 202 and at least two plate couplers 140 (shown in FIG. 2) including, without limitation, rivets, as shown and described above with reference to FIGS. 1 and 2. Also, in the exemplary embodiment, first plate 130 and second plate 132 are coupled to wall 119 through at least two coupling points 138. In other embodiments, not shown, first plate 130 and second plate 132 are a one piece construction and bores 202 are not present in cooling channel component 128. In still other embodiments, not shown, bores 202 are not present, and cooling channel component 128 is a two piece construction including separate first plate 130 and second plate 132, and coupling of cooling channel component 128 to wall 119 accomplishes coupling of first plate 130 to second plate 132 without separately coupling first plate 130 to second plate 132.

Also, in the exemplary embodiment, third planar section 144 of second plate 132 includes a plurality of sidewalls 206 extending substantially perpendicularly from third planar section 144 to at least partially enclose the hollow cavity, not shown, defined between third planar section 144 and first plate 130. Second plate further includes at least one flue 204 defined as a void in at least a portion of at least one sidewall 206 of the plurality of sidewalls 206. Further, in the exemplary embodiment, at least one flue 204 is defined through sidewall 206 proximate first planar section 142 and second planar section 143. In other embodiments, not shown, at least one flue 204 is defined through other portions of sidewall 206 including, without limitation, proximate a midpoint thereof. In still other embodiments, not shown, no flues 204 are present in cooling channel component 128. Inclusion of at least one flue 204 facilitates further intra-compartment airflow in addition to intra-compartment airflow provided through first apertures 134 and second apertures 136. Additional feature numbers are shown in FIG. 3 to facilitate cross-referencing FIG. 3 with FIGS. 1 and 2, and further figures shown and described below.

Figure 4:
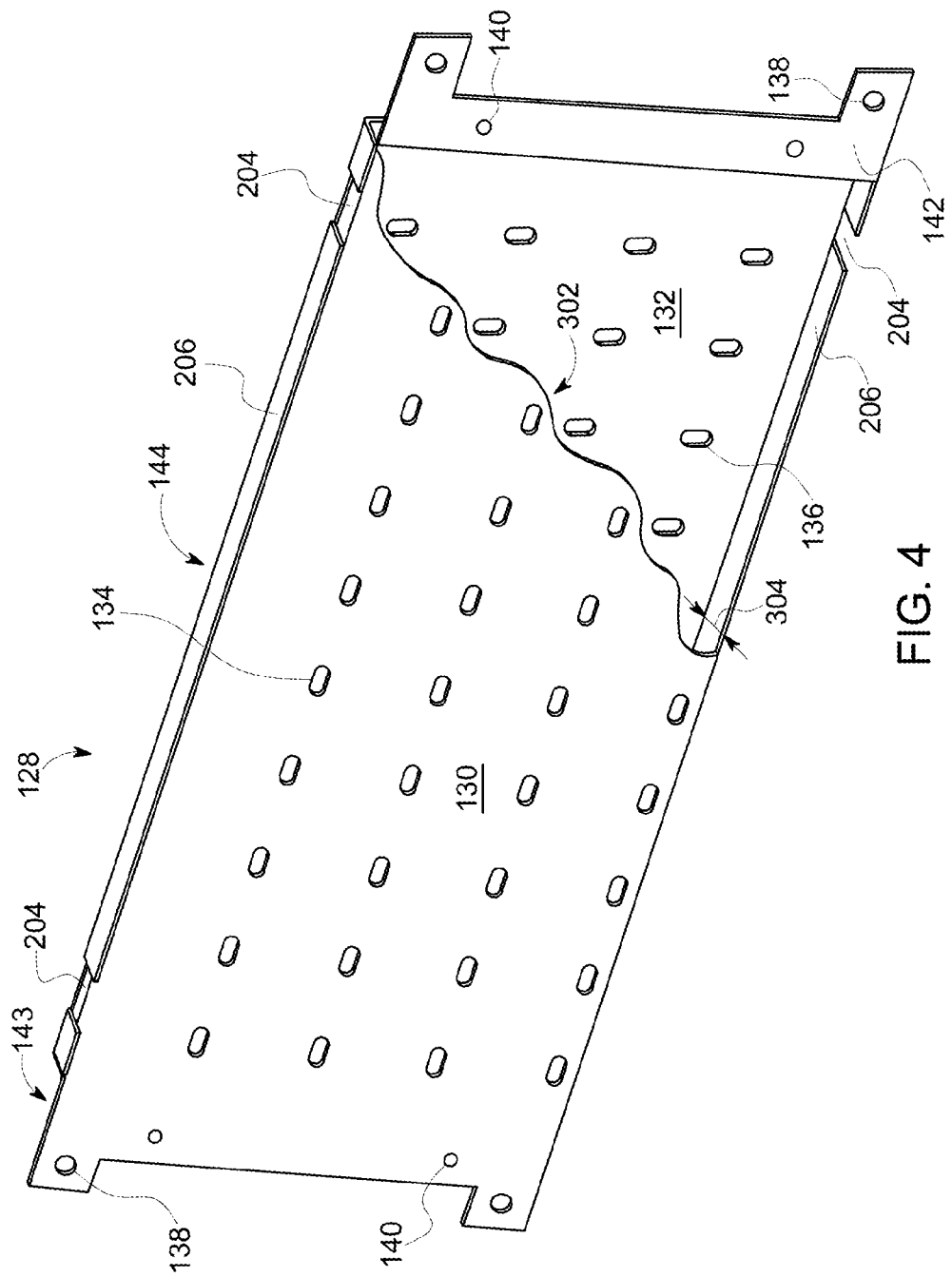
FIG. 4 is a perspective and partial cutaway schematic diagram of an exemplary embodiment of an assembled cooling channel component that may be used with the electrical enclosure shown in FIG. 1.

FIG. 4 is a perspective and partial cutaway schematic diagram of an exemplary embodiment of an assembled cooling channel component 128 that may be used with the electrical enclosure 100 shown in FIG. 1. As shown and described above with reference to FIGS. 1 and 2, first plate 130 is coupled to second plate 132 using couplers such as rivets, not shown, placed through bores 202. First apertures 134 are oriented in a first direction substantially perpendicular, i.e., orthogonal, to second apertures 136, as shown and described above with reference to FIGS. 1 and 2. In other embodiments, not shown, first apertures 134 are oriented in other directions with respect to second apertures 136 including, without limitation, a same direction and an angled direction other than perpendicular. In those other embodiments, however, first apertures 134 may be defined through first plate 130 such that no portion of any first apertures 134 overlaps, i.e., in a direct line-of-sight, of any portion of second apertures 136. In other words, first apertures 134 are not visible to an observer viewing a cooling channel component 128 from directly perpendicular to second plate 132. As such, at least one first aperture 134 and at least one second aperture 136 are arranged in a non-overlapping configuration on first plate 130 and second plate 132, respectively.

Also, in the exemplary embodiment, a hollow cavity 302 is defined between first plate 130 and second plate 132. Upon coupling of first plate 130 to second plate 132, first plate 130 defines a first plane residing a fixed distance 304 from a parallel second plane defined by third planar section 144. By virtue of distance 304, first plate 130 and third planar section 144 of second plate 132 thus form hollow cavity 302 inside of cooling channel component 128.

Figure 5:
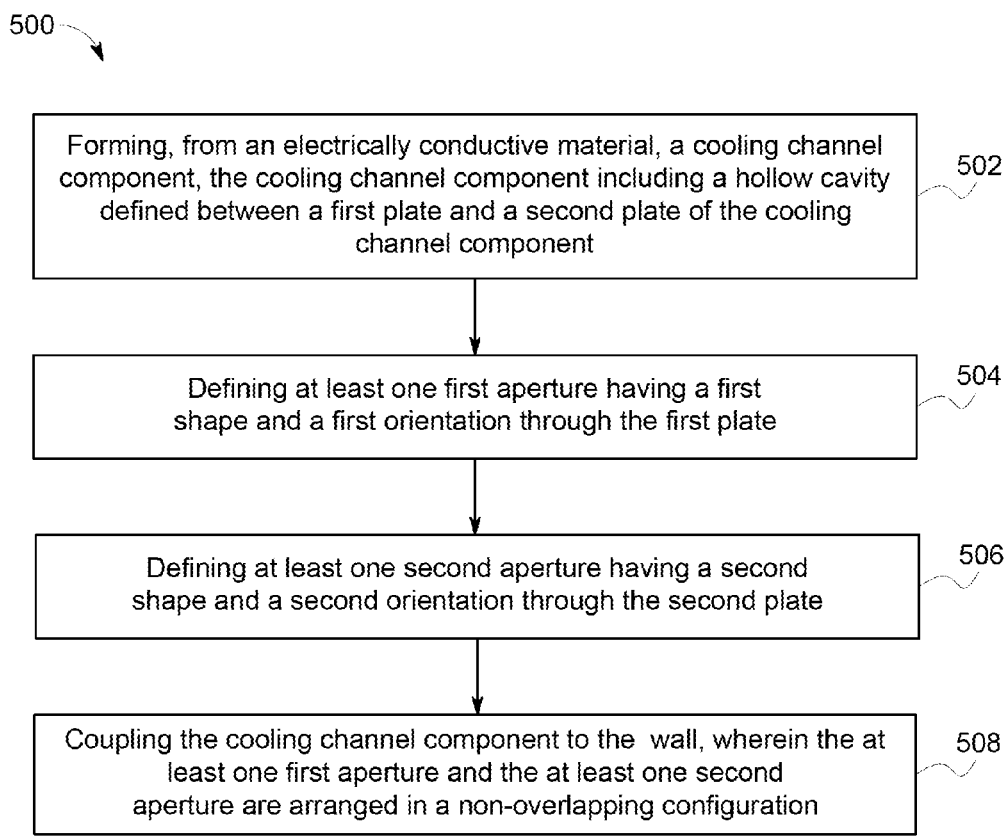
FIG. 5 is a flowchart of an exemplary method of assembling an electrical enclosure that may be used with the electrical enclosure shown in FIG. 1.

FIG. 5 is a flowchart of an exemplary method of assembling an electrical enclosure that may be used with the electrical enclosure shown in FIG. 1. Method 500 includes a step 502 during which a cooling channel component, for example cooling channel component 128, is formed, i.e., fabricated, from an electrically conductive material including, without limitation, a metal and/or metal-clad material. Also, in step 502, cooling channel 128 includes forming a hollow cavity, for example hollow cavity 302, in cooling channel component 128. Hollow cavity 302 is formed in cooling channel component 128 during fabrication of cooling channel component 128, and is defined by a finite distance, for example distance 304, between a first plate, for example first plate 130, and a second plate, for example third planar section 144 of second plate 132.

Also, in the exemplary embodiment, method 500 includes a step 504 during which at least one first aperture, for example first aperture 134, is defined through the first plate, the first aperture having a first shape and a first orientation, as shown and described above with reference to FIGS. 1-4. Similarly, at a step 506 of method 500, at least one second aperture, for example second aperture 136, is defined through the second plate, the second plate having a second shape and a second orientation, also as shown and described above with reference to FIGS. 1-4. First apertures and second apertures 136 are arranged in a non-overlapping configuration, as shown and described above with respect to FIGS. 1-4. Method 500 further includes a step 508. At step 508, cooling channel component 128 is coupled to at least one wall 119 of electrical enclosure 100. As a consequence of steps 502, 504, and 506, no portion of at least one first aperture is visible to an observer viewing cooling channel component 128 from a vantage point perpendicular to the second plate. That is, at least one first aperture and at least one second aperture are defined and arranged on first plate and second plate, respectively, in a non-overlapping configuration. As such, no intentional openings (as that term is used in the aforementioned standards such as from IEEE) are introduced between compartments of electrical enclosure 100. Method 500 facilitates assembly of cooling channel components 128 into electrical enclosures 100. Electrical enclosures such as electrical enclosure 100 are assembled with cooling channel components 128 during fabrication, i.e., manufacture, thereof. It is also possible to assemble cooling channel components 128 into pre-existing electrical enclosures 100 with minor modifications, i.e., retrofitting. For example, a suitably-sized opening 129 may be cut into wall 119 of an existing electrical enclosure 100, as described above with reference to FIG. 1.

The above-described cooling channel component devices and associated systems and methods thereof are suited to facilitate air exchange between compartments of electrical enclosures. The embodiments are also suited to facilitate effective heat exchange between electrical devices operating inside electrical enclosures and an external environment thereof. The systems and methods are further suited to facilitate safe and continuous operation of electrical enclosures. The above-described systems and methods are also suited to prevent intra-compartment travel of electrical arcs arising from arc events occurring inside of electrical enclosures. The above-described cooling channel component devices and associated systems and methods thereof are further suited to meet electrical enclosure construction and operation standards from, for example, IEEE, by facilitating intra-compartment airflow without introducing intentional openings between compartments.

Exemplary embodiments of the above-described cooling channel component devices and associated systems and methods thereof are not limited to the specific embodiments described herein, but rather, components of systems and/or steps of the methods may be utilized independently and separately from other components and/or steps described herein. For example, the methods, systems, and apparatus may also be used in combination with other systems that experience intra-compartment air-flow and electrical arc travel, and the associated methods are not limited to practice with only the systems and methods as described herein. Rather, the exemplary embodiments can be implemented and utilized in connection with many other applications, equipment, and systems that may benefit from using the above-described embodiments of the above-described cooling channel component devices and associated systems and methods thereof to improve the safety and reliability of operation for protective enclosures containing electrical devices and systems and other related systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical enclosure comprising:
   at least one circuit breaker;
   a plurality of exterior panels defining a volume;
   a wall separating two compartments defined in the volume; and
   a cooling channel component comprising:
   an electrically conductive first plate coupled to said wall, said first plate comprising a first end coupled to said wall and a second opposite end coupled to said wall, said first plate covering an opening defined in said wall and having at least one first aperture defined therethrough, the at least one first aperture having a first shape and a first orientation; and
   an electrically conductive second plate coupled to said first plate and comprising a first end coupled to said first plate first end and a second opposite end coupled to said first plate second end, said second plate having at least one second aperture defined therethrough, the at least one second aperture having a second shape and a second orientation, the second orientation is different from the first orientation, wherein a hollow cavity is defined between said first plate and said second plate, and wherein the at least one first aperture and the at least one second aperture are arranged in a non-overlapping configuration.

2. An electrical enclosure in accordance with claim 1, wherein said first plate is coupled to said wall that separates a busbar portion of said electrical enclosure from a bus connection portion of said electrical enclosure.

3. An electrical enclosure in accordance with claim 1, wherein at least one of the first shape and the second shape is an elongate arcuate shape.

4. An electrical enclosure in accordance with claim 1, wherein the first shape and the second shape are the same.

5. An electrical enclosure in accordance with claim 1, wherein the first orientation is substantially perpendicular to the second orientation.

6. An electrical enclosure in accordance with claim 1, wherein said second plate comprises:
   a first planar section;
   a second planar section;
   a third planar section offset from said first and second planar sections; and
   a plurality of sidewalls extending substantially perpendicular from said third planar section to at least partially enclose the hollow cavity.

7. An electrical enclosure in accordance with claim 6, wherein at least one flue is defined in at least one sidewall of said plurality of sidewalls.

8. A cooling channel component for an electrical enclosure that includes at least one circuit breaker, said cooling channel component comprising:
   an electrically conductive first plate coupled to a wall of the electrical enclosure that separates two compartments of the electrical enclosure, said first plate comprising a first end coupled to the wall and a second opposite end coupled to the wall, said first plate covering an opening defined in the wall and having at least one first aperture defined therethrough, the at least one first aperture having a first shape and a first orientation; and
   an electrically conductive second plate coupled to said first plate and comprising a first end coupled to said first plate first end and a second opposite end coupled to said first plate second end, said second plate having at least one second aperture defined therethrough, the at least one second aperture having a second shape and a second orientation, the second orientation is different from the first orientation, wherein a hollow cavity is defined between said first plate and said second plate, and wherein the at least one first aperture and the at least one second aperture are arranged in a non-overlapping configuration.

9. A cooling channel component in accordance with claim 8, wherein said first and second plates comprise at least one of a metal material and a metal-clad material.

10. A cooling channel component in accordance with claim 8, wherein said first plate is coupled to the wall that separates a busbar portion of the electrical enclosure from a bus connection portion of the electrical enclosure.

11. A cooling channel component in accordance with claim 8, wherein at least one of the first shape and the second shape is an elongate arcuate shape.

12. A cooling channel component in accordance with claim 8, wherein the first shape and the second shape are the same.

13. A cooling channel component in accordance with claim 8, wherein the first orientation is substantially perpendicular to the second orientation.

14. A cooling channel component in accordance with claim 8, wherein said second plate comprises:
   a first planar section;
   a second planar section;
   a third planar section offset from said first and second planar sections; and
   a plurality of sidewalls extending substantially perpendicular from said third planar section to at least partially enclose the hollow cavity.

15. A cooling channel component in accordance with claim 14, wherein at least one flue is defined in at least one sidewall of said plurality of sidewalls.

16. A method of assembling an electrical enclosure including at least one circuit breaker, a plurality of compartments, and a wall separating two compartments of the plurality of compartments, said method comprising:
   forming, from an electrically conductive material, a cooling channel component, the cooling channel component including a hollow cavity defined between a first plate and a second plate of the cooling channel component;
   defining at least one first aperture having a first shape and a first orientation through the first plate;
   defining at least one second aperture having a second shape and a second orientation through the second plate, the second orientation is different from the first orientation; and coupling the cooling channel component to the wall, wherein the at least one first aperture and the at least one second aperture are arranged in a non-overlapping configuration.

17. A method in accordance with claim 16, wherein defining the at least one first aperture through the first plate comprises at least one of: defining the at least one first aperture having the first shape that is the same as the second shape; and
   defining the at least one first aperture having the first orientation that is substantially perpendicular to the second orientation.

18. A method in accordance with claim 16, wherein coupling the cooling channel component to the wall comprises coupling the cooling channel component to a wall that separates a busbar portion of the electrical enclosure from a bus connection portion of the electrical enclosure.

19. A method in accordance with claim 16, wherein forming the cooling channel component comprises forming the cooling channel component having the second plate that includes a first and a second planar section, a third planar section offset from the first and second planar sections, and a plurality of sidewalls extending substantially perpendicular from the third planar section to at least partially enclose the hollow cavity.

20. A method in accordance with claim 19, wherein forming the cooling channel component having the second plate comprises defining at least one flue in at least one sidewall of the plurality of sidewalls.

* * * * *